May 2, 1950 L. W. KASS 2,505,974
BRAKE BEAM SAFETY SUPPORT
Filed May 15, 1947 2 Sheets-Sheet 1

Inventor:
Lawrence W. Kass.
Attys.

May 2, 1950 L. W. KASS 2,505,974
BRAKE BEAM SAFETY SUPPORT
Filed May 15, 1947 2 Sheets-Sheet 2
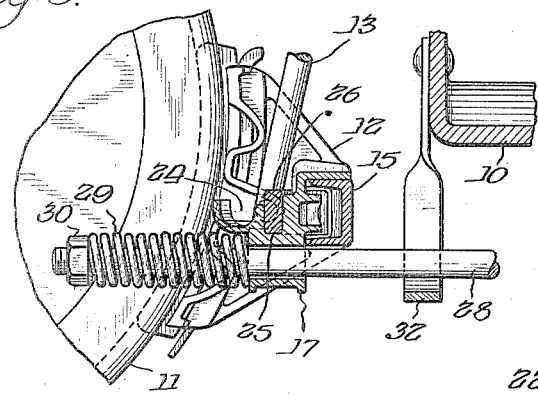
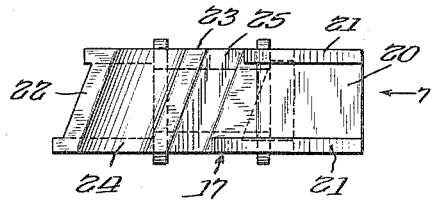
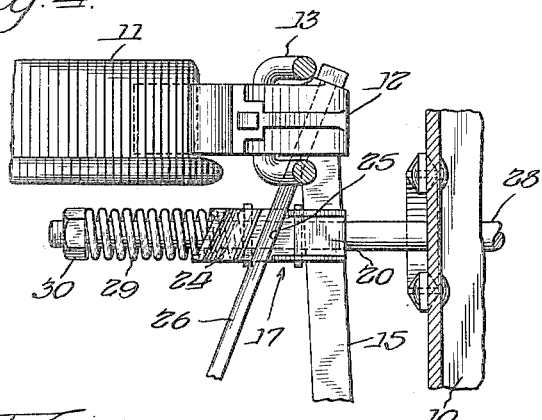
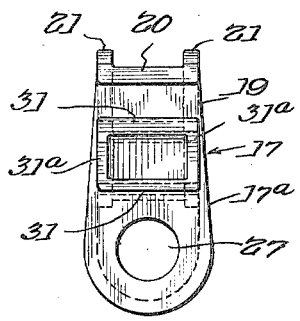
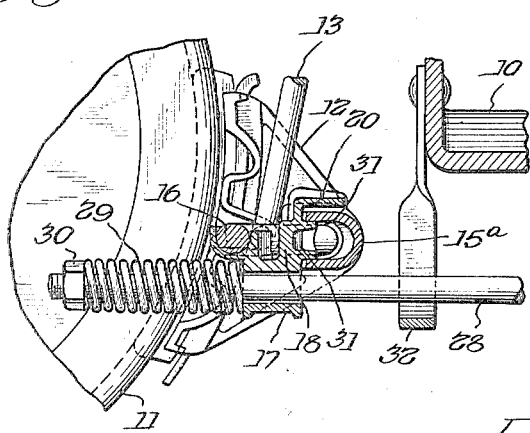
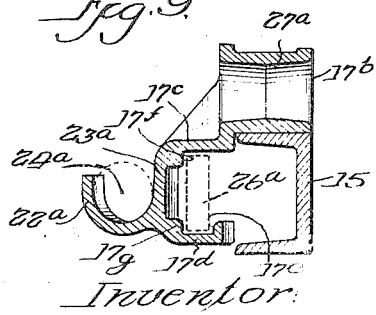
Inventor:
Lawrence W. Kass.
By Hill & Hill
Attys.

Patented May 2, 1950

2,505,974

UNITED STATES PATENT OFFICE 2,505,974

BRAKE BEAM SAFETY SUPPORT

Lawrence W. Kass, Chicago, Ill., assignor to Grip Nut Company, Chicago, Ill., a corporation of Illinois Application May 15, 1947, Serial No. 748,173

6 Claims. (Cl. 188—210)

This invention relates to brake beam safety supports and its principal object is the provision of a novel bracket for connecting the brake beams of brake rigging with a certain positioning rod. In its present form the bracket is adapted for use in connection with several standard makes of brake beams.

As is well known in many standard car trucks the brake beams are disposed between the front and rear wheels of a truck and are suspended by hangers swingably mounted on the truck frame. Brake actuating mechanism is connected to the brake beams and functions to set and release the brake, but as the actuating mechanism forms no part of this invention it has not been illustrated and will not be described.

Another object is the provision of a safety support for brake beams which safely supports the brake beam in the event of failure of a hanger or other supporting means.

Another object is to provide a bracket which can be applied to a channeled compression member or one of U-shape in cross section, and also can be applied to round tension rod or to a tension rod of rectangular cross section.

Other objects and advantages will appear in the course of this specification, and with said objects and advantages in view this invention consists in the several novel features of construction, arrangement and combination of parts hereinafter fully set forth and more definitely pointed out in the appended claims.

The invention is clearly illustrated in the drawings accompanying this specification in which:

Fig. 3 is a view partly in side elevation and partly in vertical longitudinal section through the bracket and showing the same applied to a different form of brake beam;

Fig. 4 is a view partly in plan and partly in horizontal section of the parts seen in Fig. 3;

Fig. 5 is a view partly in side elevation and partly in vertical longitudinal section through the bracket and showing the same applied to another kind of brake beam;

Fig. 6 is a detail enlarged plan of the bracket;

Fig. 7 is an elevation of the bracket looking in the direction of the arrow 7 in Fig. 6;

Fig. 9 is a vertical section through a modified form of bracket.

Figure 1:
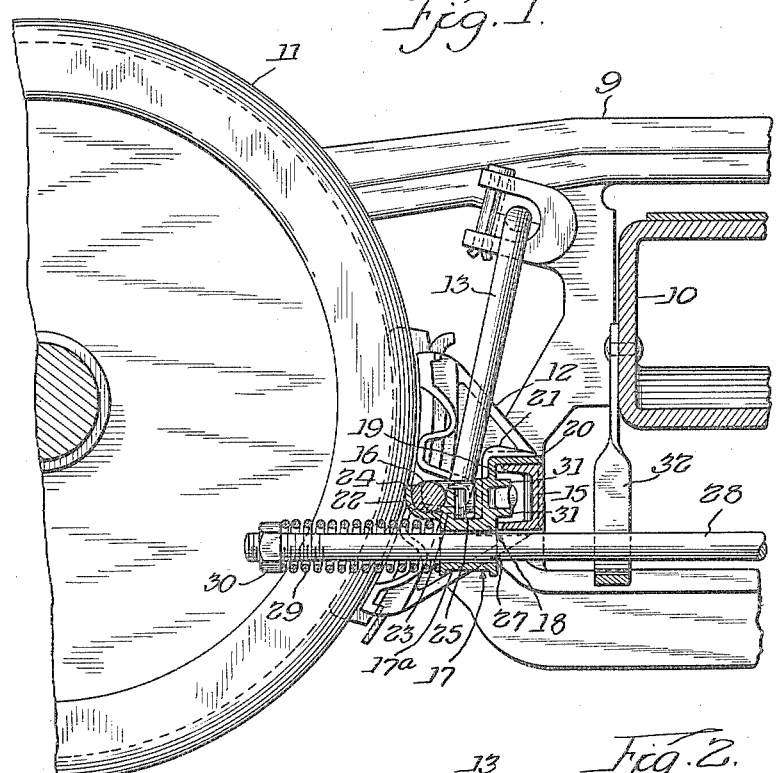
Fig. 1 is a view partly in side elevation and partly in vertical longitudinal section taken along the line 1—1 of Fig. 2, of a brake beam safety support embodying a simple form of the present invention and showing the same applied to a car truck, which is partly broken away.
Figure 2:
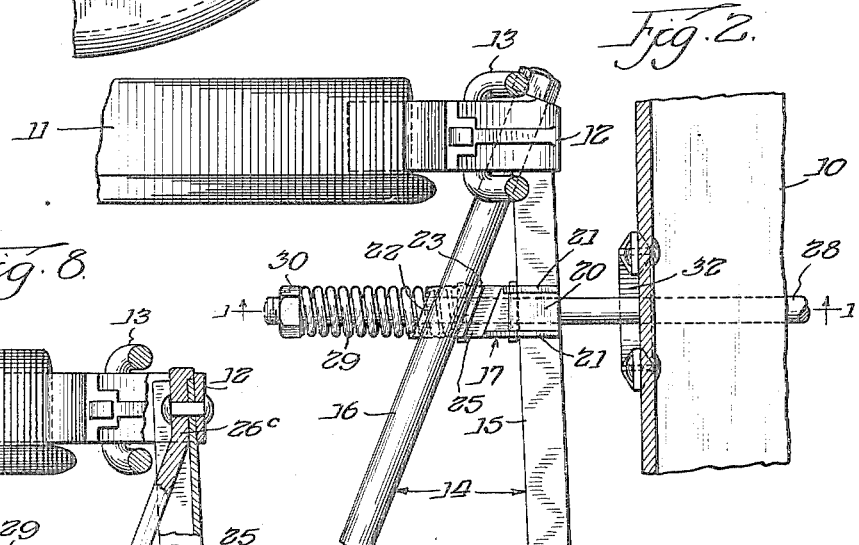
Fig. 2 is a view partly in plan and partly in horizontal section of the brake beam safety support seen in Fig. 1.

Referring to said drawings and first to Figs. 1 and 2, the reference character 10 designates a fragment of one of the bolsters of a railway car truck; 11 designates a fragment of one of the wheels; 12 designates one of the brake heads with its brake shoe; and 13 designates one of the hangers for the brake beam. The hangers are each swingably carried by a member of a truck frame 9 and connected to the brake heads in the usual manner. A fragment of a brake beam is seen at 14 and is secured to the brake heads, one of which is illustrated. As is usual the brake beam is composed of a compression member 15 and a tension member 16 united to the brake heads. In the form of brake beam illustrated in Figs. 1 and 2 the compression member 15 is in the form of a channel member and the tension member is in the form of a round rod, which extends at a suitable angle to the compression member as is customary. It is to be understood that the brake beam, the brake head and the hanger are duplicated on the other side of the bolster as is customary. The parts above described are standard equipment of railway cars and require no further description so far as this specification is concerned.

Interposed between the compression and tension members adjacent each hanger 13, is a bracket 17 preferably composed of a single piece, having an upstanding wall 18 at one end of the body 17a from which rises a narrower wall 19, which terminates in a horizontally extending flange 20 that is arranged to lie upon the compression member 15. Desirably, ribs 21 are formed on the wall 19 and flange 20 for the purpose of giving added strength and rigidity thereto.

The other end of the body of the bracket 17 is formed with an upwardly curved wall 22 and between the walls 18, 22 the body is formed with an intermediate upstanding wall 23. Between the walls 22, 23 is formed a round groove 24, which extends at the same angle to the compression member 15 as the tension member 16 extends with respect thereto, and the tension member is adapted to lie in said groove 24. Between the walls 18 and 23 is a horizontal groove 25, of rectangular cross section which extends at the same angle to the compression member as the groove 24 extends with respect thereto.

The groove 25 is intended to accommodate the bracket to brake beams in which a tension member 26 of rectangular cross section is employed as is clearly seen in Figs. 3 and 4.

In the main portion of the body of the hanger is formed an opening 27, which extends lengthwise of the body and is adapted to receive a positioning rod 28 located below the bolster 10 and extending through the bodies of the two brackets at one side of the truck frame. Coiled compression springs, one of which is seen at 29, surround the positioning rod and are interposed between one end of each bracket body and a nut 30 threadedly mounted upon the extreme end of the rod. The spring is compressed when the brakes are applied and functions to aid in releasing the brakes.

An auxiliary support, here shown in the form of a U-shaped loop 32, secured to a member of the truck, such as the bolster 10, provides means to support the positioning rod and therewith the brake beam, in case of failure of a hanger or failure of some other connection between the brake beam and truck frame.

In some standard braking mechanisms the compression member is in the form of a bar 15a, U-shaped in cross section (see Fig. 5), and to accommodate the bracket 17 to such form of compression bar the wall 18 of the bracket body is formed with two spaced horizontally extending ribs 31 and vertically extending ribs 31a that extend from the end wall and enter the channel of the U-shaped compression bar 15a.

Figure 8:
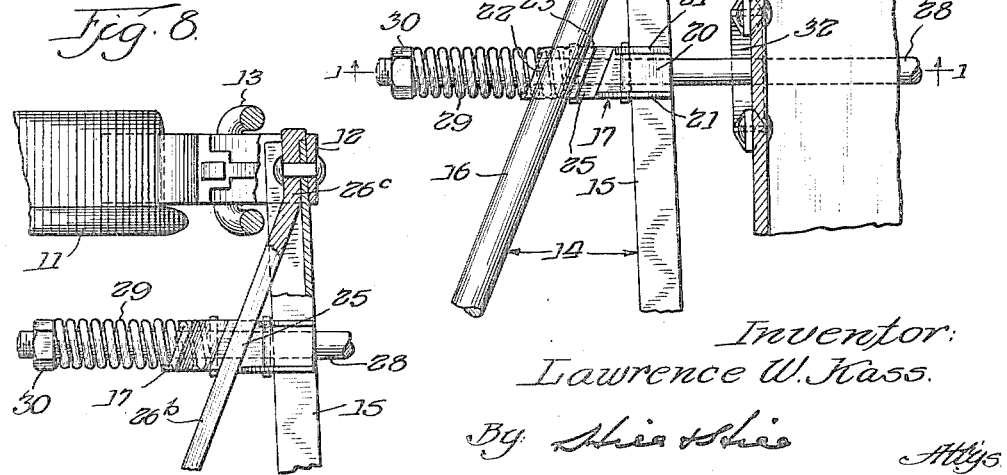
Fig. 8 is a fragmental view partly in plan and partly in horizontal section showing the bracket applied to another kind of brake beam.

In some types of brake beams the tension member is in the form of a flat bar 26b (see Fig. 8), which extends at an angle to the compression member 15 and at its end extremities is bent to extend parallel with the compression member as at 26c. The tension member is riveted, or otherwise rigidly secured to the compression member, and each oblique portion lies in the groove 25 of the casting 17.

In the modified form of casting illustrated in Fig. 9 the main body portion 17b is arranged to rest upon the compression member 15 and is formed with the hole 27a through which the positioning rod (not shown) extends. From the main body of the casting extends a horizontal flange 17c which terminates in an upright web 23a the lower end of which terminates in two branches, one forming a flange 22a, substantially semi-circular in cross section, and the other forms a horizontal flange 17d which cooperates with the flange 17c to receive between them a tension member 26a of rectangular cross section. The flange 17d is formed with a rectangular groove 17e in its upper face to receive the lower edge of the tension member and the flange 17c is formed with an upright wall 17f vertically aligned with the wall 17g of the flange 17d. The groove 24a of the flange 22a is intended to receive a round tension rod whenever this type of bracket is used in with a brake beam employing a round tension rod.

The positioning rod functions in the same manner as does the positioning rod shown in the other figures and it is adapted to be supported by loops (not shown), or by a member of the car truck in any desirable manner.

This modified form of bracket also is capable of use with brake beams of various types.

In the operation of the safety support, the brakes are applied and released as is customary. In case of failure of a hanger or other connection between the truck frame and brake beam, the positioning rod 28 drops upon the looped portion of the auxiliary support 32 and supports the brake beam until the necessary repairs have been made.

From the above it is apparent that I have provided a bracket, which is capable of use with several forms of brake beams. This avoids the necessity of keeping in stock several kinds of brackets, as the one type will serve the purpose for several of the standard makes of brake beams.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. A bracket for use with brake beam safety supports, comprising a single piece body formed with a horizontal flange at one end adapted to rest upon the channeled compression member of a brake beam, said bracket being also formed with two horizontally extending grooves in the upper face of the body, which grooves extend at an angle to the compression member, one of said grooves being curved in cross section and the other being rectangular in cross section, and said body having a hole extending parallel with the length of the body and adapted to receive a positioning rod.

2. A bracket for use with brake beam safety supports, comprising a singe piece body formed with a horizontal flange at one end adapted to rest upon the channeled compression member of a brake beam, and below said flange formed with horizontally extending ribs adapted to engage in the channel of a U-shaped compression member, said bracket being also formed with two horizontally extending grooves in its upper face which extend at an angle to the compression member, one of which grooves is arranged to receive a round tension member and the other of which is arranged to receive a tension member of rectangular cross section and there being a hole in said body extending parallel with the length thereof and adapted to receive a positioning rod.

3. A bracket for use with brake beam safety supports, comprising a single piece body formed with a horizontal flange at one end adapted to rest upon the channeled compression member of a brake beam, and below said flange formed with two parallel horizontally extending ribs adapted to engage in the channel of a U-shaped compression member, said bracket being also formed with two horizontally extending grooves in its upper face which extend at an angle to the compression member, one of which grooves is round and arranged to receive a round tension member and the other of which is rectangular in cross section and arranged to receive a tension member of rectangular cross section and there being a hole in said body extending parallel with the length thereof and adapted to receive a positioning rod.

4. A bracket for use with brake beam safety supports, comprising a single piece body formed with an upstanding wall at one end terminating in a horizontal flange adapted to rest upon the channeled compression member of a brake beam, and below said flange formed with horizontally extending ribs adapted to engage in the channel of a U-shaped compression member, said bracket being also formed with two horizontally extending grooves in its upper face which extend at an angle to the compression member, one of which grooves is round and arranged to receive a round tension member and the other of which is arranged to receive a tension member of rectangular cross section and there being a hole in said body below said grooves extending parallel with the length thereof and adapted to receive a positioning rod.

5. A bracket for use with a brake beam safety support, comprising a single piece formed with a body portion having a hole therethrough to receive a positioning rod, and formed with walls, one shaped to form a semi-circular groove and the other shaped to form a groove of rectangular form extending approximately parallel with the semi-circular groove, the semi-circular groove being adapted to receive a round tensioning rod and the rectangular groove being adapted to receive a tension rod of rectangular cross section.

6. A bracket for use with a brake beam safety support, comprising a single piece formed with a body adapted to rest upon the compression member of a brake beam, said body having a hole therethrough to receive a positioning rod, a horizontal flange projecting laterally from said body and terminating in a vertical web which is formed at its lower end with two oppositely directed branches, one of which is approximately semi-circular in cross section adapted to receive a round tensioning member, and the other branch of which is formed with a groove of rectangular cross section adapted to receive a tensioning member of rectangular cross section.

LAWRENCE W. KASS.

REFERENCES CITED

The following references are of record in the file of this patent:

UNITED STATES PATENTS

| Number | Name | Date |
| --- | --- | --- |
| 1,976,694 | Anderson | Oct. 9, 1934 |
| 2,142,417 | Sale | Jan. 3, 1939 |
| 2,252,221 | Van Cleave et al. | Aug. 21, 1941 |